Jan. 4, 1949.    H. A. STRICKLAND, JR    2,457,845
INDUCTION HEATING APPARATUS FOR HEAT TREATING
THE INTERIOR SURFACE OF ELONGATED
SMALL-DIAMETER TUBULAR WORKPIECES
Filed Jan. 12, 1945    3 Sheets-Sheet 1

INVENTOR
Harold A Strickland Jr.
BY John P. Tarbox
ATTORNEY

Jan. 4, 1949.   H. A. STRICKLAND, JR   2,457,845
INDUCTION HEATING APPARATUS FOR HEAT TREATING
THE INTERIOR SURFACE OF ELONGATED
SMALL-DIAMETER TUBULAR WORKPIECES

Filed Jan. 12, 1945   3 Sheets-Sheet 2

INVENTOR
Harold A. Strickland Jr.
BY John P. Fairfax
ATTORNEY

Patented Jan. 4, 1949

2,457,845

UNITED STATES PATENT OFFICE 2,457,845

INDUCTION HEATING APPARATUS FOR HEAT-TREATING THE INTERIOR SURFACE OF ELONGATED SMALL-DIAMETER TUBULAR WORKPIECES

Harold A. Strickland, Jr., Detroit, Mich., assignor, by mesne assignments, to The Ohio Crankshaft Company, Cleveland, Ohio, a corporation of Ohio Application January 12, 1945, Serial No. 572,461

15 Claims. (Cl. 219—13)

This invention relates to induction heating apparatus and particularly to apparatus applicable to heating the interior surface of long tubes having small restricted spaces, such as a rifle bore.

In heating a bore space where the diameter of the bore is less than one inch certain problems of induction heating become pronounced. Among these problems are the support of the inductor head so as to maintain the inductor coil at a fixed space from the tube surface irrespective of the axial position of the head, the supply of adequate heating to the limited space, and the supply, also, of sufficient coolant through the circuit so as to maintain the inductor and associated conducting elements in operable condition. Other problems pertain to the prevention of arcing causing pitting on the workpiece, elimination of working of parts due to extreme changes in temperature within the limited spaces and related problems.

Accordingly, the objects of the invention may be stated as follows: To provide means for supplying in a constricted interior large amounts of current; to provide an efficient coolant circuit for maintaining the temperature of the conductors in operable condition; to provide electrical connections to the heating apparatus which will substantially prevent the formation of arcs between the conductors and the workpiece; to provide conductor supports which will permit temperature movement of the conductors during the heating operation; to provide adequate insulation means for prevention of leakage or short circuiting of the inductor unit; to provide adjacent the inductor a metal pilot ring or element which will prevent undue wear of the unit due to continuous insertions within assorted workpiece interiors; to provide appropriate means for supporting the workpiece and the inductor and to secure relative movement between these elements whereby progressive treatment of the workpiece may be secured; to provide means for rotating the workpiece in relation to the inductor which will insure uniformity of heat treatment; to provide an adjustable quench element to be used with the inductor to permit displacement for insertion or removal of the workpiece; to provide workpiece supporting means rotatable in nature whereby uniformity in the heat treatment of the workpiece is obtainable; to provide in general a compact and efficient inductor apparatus readily applicable to tubular interiors.

Having in mind the above objects of the invention, one mode and associated mechanism by which these objects may be accomplished are set forth in the following description and illustrated in the accompanying drawings, in which.

Figure 2:
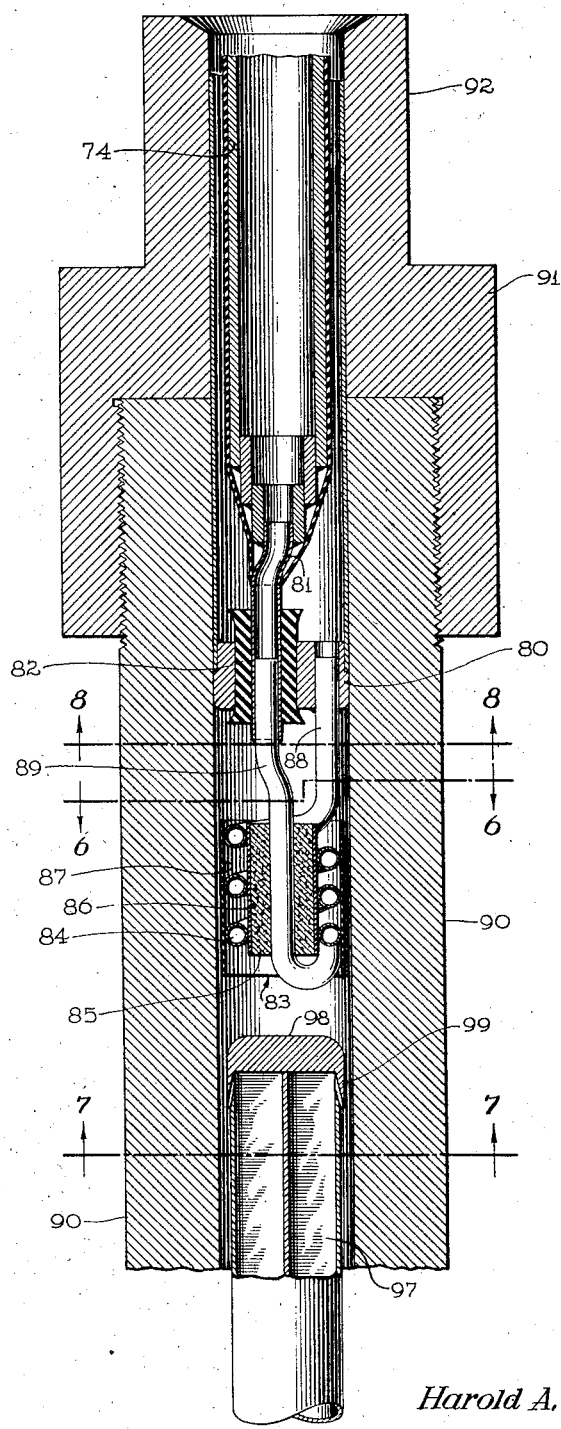
Figure 2 is a longitudinal section through the inductor unit, workpiece and quench element with associated parts.
Figure 6:
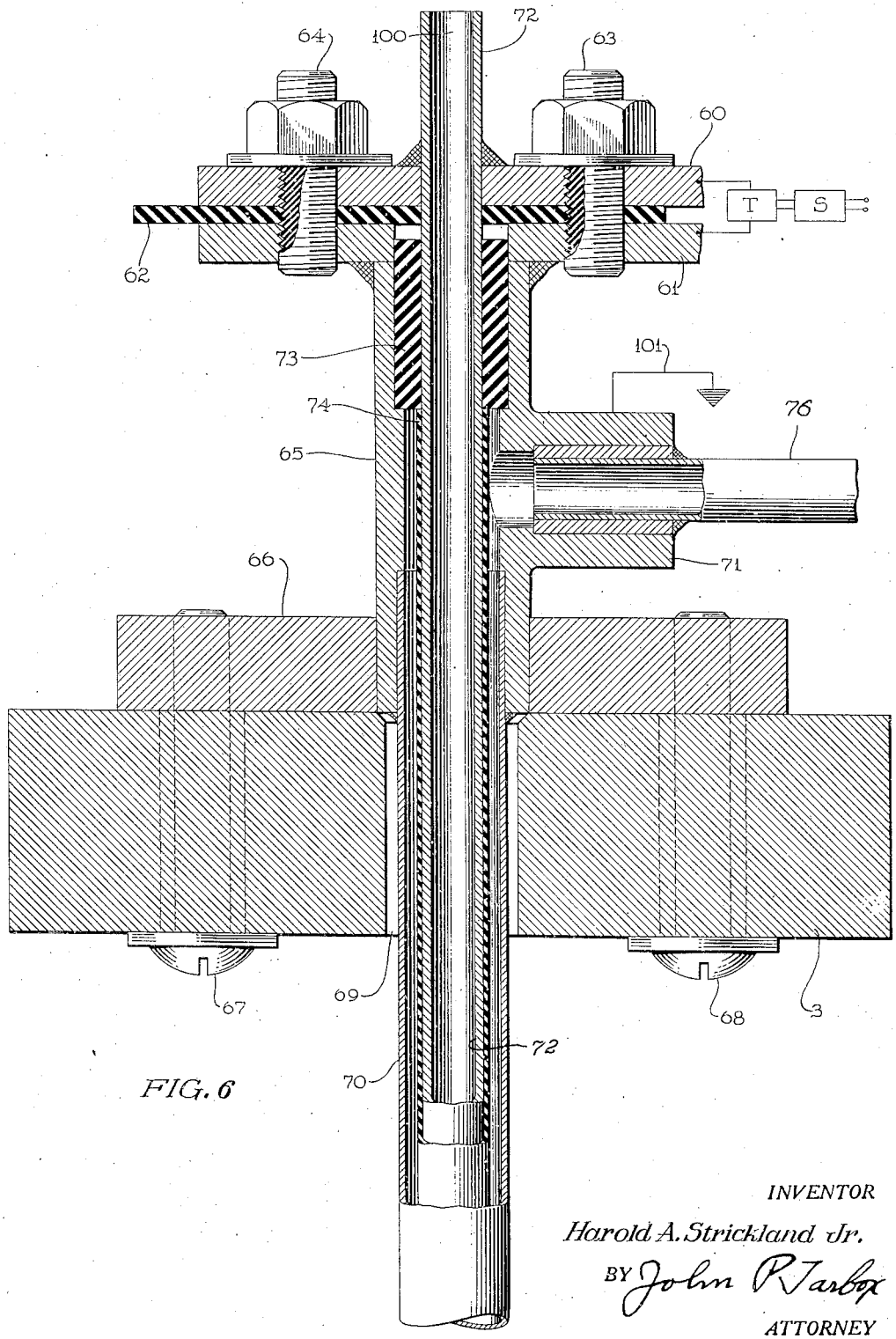

Figures 3, 4 and 5 are sections through the apparatus taken along lines 6—6, 7—7 and 8—8, respectively, of Figure 2; and Figure 6 is a sectional view through the upper frame of the inductor support showing the mode of connection to the bus bars and indicating diagrammatically the electrical connections.

Figure 1:
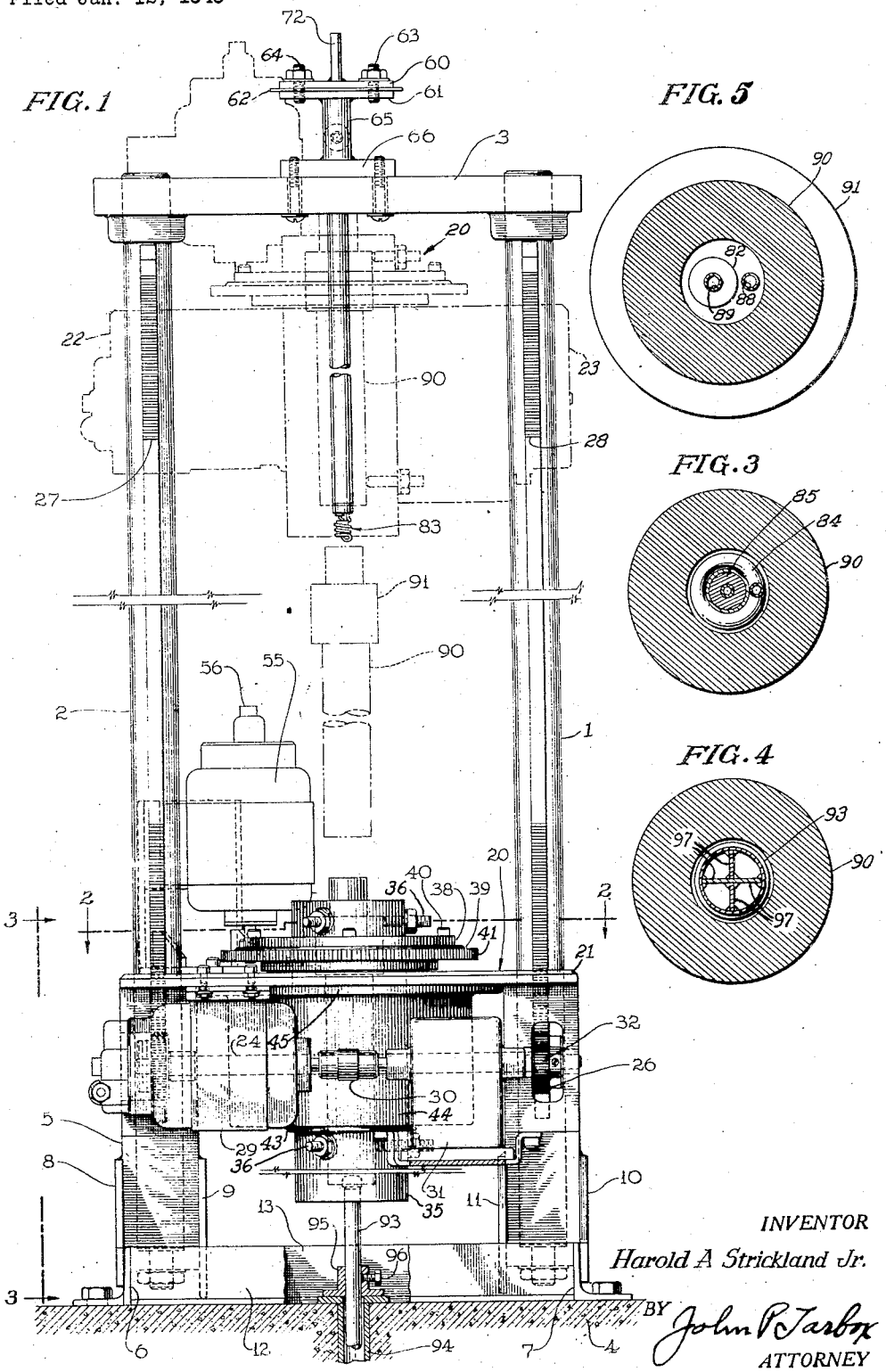
Figure 1 is a side elevation of the apparatus showing the movable work support.

Referring to Figure 1 the induction heating apparatus takes the form of an up-standing structure having two main support rods 1 and 2 connected together at their upper end by a cross bar 3 and mounted on a base plate 4 through end sockets 5 and angle plates 6 and 7. Upwardly projecting side plates 8, 9, 10 and 11 are provided adjacent the sockets and angle plates to give additional support. The work support, generally indicated by the numeral 20, consists of a square plate 21, centrally apertured to receive the workpiece unit and also apertured at diametrically opposite points, adjacent the plate edge to permit placement of the plate on the support rods 1 and 2. Adapted to have sliding engagement with these support rods are two slide blocks which are fixed, as by welding, to the plate 21 so as to include the edge apertures. The blocks are of sufficient length to give relative stability for vertical movement of the plate on the support rods and of sufficient mass so as to serve for supports of a pinion shaft 24, one end extending between the two blocks as shown in dotted outline in Figure 1. The ends of the shaft 24 are provided with pinions 25 and 26 which are adapted to engage the racks 27 and 28 formed axially on the adjacent surface of the support rods 1 and 2 through an axially extending opening in the slide blocks 22 and 23.

Movement is imparted to the support plate 21 through transmission to the pinion shaft of power from a motor 29 through an appropriate transmission to the pinion 26 connected to the pinion shaft 24. Hence by the manipulation of the gear connections in the gear box or by other conventional means, power may be supplied the rack pinions to move the table plate up or down upon the support posts 1 and 2 as desired. All of the mentioned elements including the motor and the gear connections are secured as by bolts 33 to the support plate 21 so that these elements with the support plate move as a unit.

Mechanism for causing rotation of the workpiece is mounted in and about the central aperture of the support plate 21. This mechanism includes a supporting tube 35 provided at its upper and lower ends with set screws 36 spaced approximately 120 degrees around the cylinder so as to provide centering means for the workpiece within the tube. The tube 35 is fixed to a disc 38 as by welding, the disc being apertured to permit placement about the upper end of the support tube. The disc 38 in turn is mounted on a gear wheel 39 by means of machine screws 40 the gear wheel having circumferential teeth 41 for engagement with a pinion fixed on the vertical shaft 56 of motor 55. The motor is appropriately mounted on the plate 21 and movable therewith.

The gear wheel 39 is mounted fixedly on the upper ends of a sleeve 43 which in turn is fixed to the support tube 35. Depending from the support plate 21 is an inverted cup-shaped member 44 having an upper outturned flange 45 for securing the member by means of bolts to the support plate 21. The base of the member is apertured centrally to form a supporting area for bearing runways for forming a rotational connection between the fixed cup-shaped member 44 and the work-supporting tube 35. Each runway consists of co-acting annular members having adjacently positioned grooves and ball bearings 50 adapted to have movement therein and permit relative rotational movement between the supporting tube 35 and the fixed support plate.

Appropriate electrical connections are made to motors 29 and 55 to operate the same as desired.

The cross bar 3 at the top of the apparatus joining the supporting rods 1 and 2 serves as a support also for the inductor unit including the inductor, the concentric conductors leading to the inductor, the connecting bus bars and the coolant connections. The inductor unit comprises at its upper end bus bars 60 and 61 displaced from each other by the rubber insulation 62 and held in fixed relative position by the fiber screw bolts 63 and 64. Depending from the lower bus bar and fixedly positioned around an opening therein is a conductor tube 65 which at its lower end is secured within an opening formed centrally in a support plate 66. This plate is mounted on the cross bar 3 and secured thereto by means of bolts 67 and 68 in such relationship that a transverse opening 69 in the cross bar is in extension of the conductor tube 65. Fixed to the lower interior surface of the conductor tube 65 so as to be flush therewith is the outer conductor 70 of the concentric lead-in conductors to the inductor unit. The exterior diameter of this conductor is substantially less than the interior diameter of the opening 69 in the cross bar 3 so that there is clearance between the cross bar and the conductor. An outlet tube 71 is formed on the conductor tube 65 as shown in Figure 9 to afford connection to a coolant pipe 76.

The upper bus bar 60 is also apertured to receive the inner conductor 72 which is fixed to this bar and extends downwardly through the conductor tube 65 and the external conductor 70 to the inductor unit as will be described hereinbelow. The conductor tube 72 is insulated from the lower bus bar 61 and conductor tube 65 by insulation tubes 73 and 74, the insulation tube 73 filling completely the space between the inner conductor 72 and the conductor tube 65 whereas there is provided a substantial space between the external surface of the insulator tube 74 and both connecting conductor tubes 65 and 70. This space is provided in order to afford a passage for coolant.

Referring to Figure 2 of the drawing it will be seen that the outer conductor terminates in a pilot or guide ring 80 having two apertures, one being of smaller diameter adjacent the edge of the guide ring and the other of larger diameter toward the center of the guide ring but eccentric to the axis. The inner conductor terminates considerably short of the end of the outer conductor and is stepped down to a short connecting tube 81 by means of two coupling tubes as shown in Figure 5. A coolant chamber is thus formed adjacent the guide ring. The connecting tube 81 has its upper end centrally placed but is offset from the axis to permit alignment of the axis thereof with the center of the larger opening formed in the guide ring 80 through which it passes. A gasket 82 of rubber or similar electrically insulating material is inserted around the connecting tube 81 to insulate the same from the metal guide ring 80, the gasket extending substantially above and below the guide ring.

The inductor or coupling element 83 for supplying the heat energy to the workpiece is mounted at the lower end of the arbor unit on the guide ring 80.

The inductor unit consist of a small metal tube wound helically three or four turns to form the heating inductor coil, 84. Within the coil 84 is positioned a core preferably of powdered insulated particles of magnetic iron 85 encased by the insulation 86. External to the coil is positioned a layer of sheet mica 87, the same being held in place by glass fiber wound about the exterior surface. One end 88 of the inductor tube is turned axially and fixed in a water tight connection within the smaller aperture of the guide plate. The other end of the tubing extending from the base turn of the coil is inversely turned to pass through the central axial opening in the core and ends in a terminal 89 extending into the base of the connecting tube 81 to which it is permanently attached.

It is pointed out that the external diameter of the inductor 83 is less than that of the guide ring 80 so that when positioned in a workpiece in which the guide ring 80 has a fairly close fit, the inductor will have adequate clearance from the workpiece so as to eliminate arcing and wear due to contact with the workpiece surface. The outer concentric conductor 70 may have a diameter equal to less than the guide ring.

Power is supplied to the bus bars 60 and 61 preferably from an oscillator source as indicated in Figure 6, the same providing current of approximately one hundred forty amperes at a frequency of approximately five hundred thousand cycles. A transformer T interposed between the oscillator and the bus bars 60 and 61 transmits current of approximately four thousand amperes at a voltage preferably between one hundred and one hundred forty volts to the inductor unit.

The inductor as described is adapted for insertion in a tubular workpiece, as for example, a rifle bore. The workpiece is indicated by the numeral 90. One end of the workpiece is threaded externally and has threaded engagement with a centering ring 91 which consists of a short tube having a reduced section 92 of lesser diameter. The workpiece with the centering ring attached is placed within the support 35 and the set screws 36 are manipulated to engage the guide ring and also the lower end of the workpiece, the set screws being manipulated to secure a proper centering of the workpiece within the tube 35.

Quench means is provided in the quench tube 93. This tube is centrally mounted in the base 4 of the apparatus, a casing tube 94 serving as a guide for the reciprocating movement of the quench tube. A fastening collar 95 resting on the base 94 and provided with a fastening screw 96 is adapted to support the quench rod in any desired position in relation to the inductor unit. The quench rod is normally in alignment with the inductor and the associated concentric conductors and during normal operation is placed with its end in close relationship to the inductor as shown in Figure 5. Preferably the end of the quench tube is formed with axial cross plates 97 as shown in Figures 2 and 4 so as to channel the coolant in multiple passageways. The quench tube terminates in a cup 98 having a wedged-shaped reversely turned flange extending over the wedged-shaped outer edge of the quench tube to form an annular reversely directed nozzle 99 as shown in Figure 2.

Having described the structural arrangement, the operation may be briefly stated. In order to insert a workpiece in the apparatus the support plate 20 is lowered to its bottom-most position and the quenching rod is retracted in the base so that the top thereof is at or below the movable support unit 20. The workpiece, with the centering ring attached is then inserted in the movable support unit and centered and retained by means of the set screws or any other conventional means. The movable support 20 is then lifted to the topmost position as shown in dotted outline in Figure 1 and the quench rod is positioned so that the nozzle tip is adjacent the lowermost end of the inductor 83. The quench fluid is then turned on and the motor giving rotation to the gear wheel 39 is energized. The movable support unit is then started in a downward movement and an instant later the switch supplying the oscillator unit is closed, the oscillator tube filaments having been previously heated to the operating temperature. Beginning at the lower end of the workpiece, heat from the inductor is applied progressively throughout the length of the same, the heat being followed after a short time interval determined by the speed of down movement by the quench.

Attention should be directed specifically to several inherent advantages in the apparatus. It is pointed out in the first place that the spaces involved in this heating operation are relatively limited for example, an inner diameter of approximately one-half inch being not unusual. In addition, the workpiece is frequently relatively long, as in a rifle barrel. Within this limited and relatively inaccessible space, current as high as four thousand amperes is conducted, producing a difficult problem in cooling. The effectiveness of the cooling of the inductor unit lies primarily in the fact that both the outer and inner conductors are placed in juxtaposition to a cooling passage, coolant being led into the inner conductor at the top point 100 and continuing through the tubular inductor and emerging on the upper side of the guide plate 80. Above the guide plate 80, the coolant surrounds the inner conductor and by reason of the space between the outer conductor and the insulation 74 passes also in direct contact with the inner surface of the outer conductor. Thus in and out movement of the coolant abstracts heat from the concentric conductors and tends to maintain the unit as a whole at an efficient temperature. Direct cooling by the coolant is supplemented by heat conduction from the inductor directly to the guide ring and workpiece.

Substantial concentration of current is made possible by the use of multiple turns in the inductor units, three or more being illustrated. It is usual to use a single turn in such an inductor but because of the efficient cooling and insulation arrangement it has been found that several turns may be used effectively. The heating effect is accentuated materially by use of a magnetic core, which is not common in heating units of this type, particularly, as in my construction, where both coil and core are supported at one end of the coil by a guide plate.

The eccentric positioning of the terminals 88 and 89 of the inductor in the guide ring 80 provides a maximum of insulation for the high potential side of the inductor so that danger of grounding or short circuiting is effectively eliminated. This is also an important feature in permitting the use of excessive currents in the unit. By grounding the outer conductor as indicated by the numeral 101 it becomes immaterial whether or not the outer conductor contacts with the workpiece so that the outer conductor throughout its length is substantially at ground potential and arcing with a consequent pitting of the interior surface of the workpiece is eliminated. All of these factors contribute to efficient employment of current of extraordinary magnitude.

Another feature contributing to the usefulness of the disclosed apparatus lies in the utilization of the metal guide ring 80 at the end of the outer conductor adjacent the inductor. The guide ring acts as a pilot for movement of the inductor unit and since it has a diameter usually in excess of the outer conductor and substantially in excess of the inductor itself it affords a ground contact adjacent the high potential end of the inductor unit, thus aiding in effectively eliminating arcing above the guide ring. The guide ring is most useful in the case of long bore heating since the ring affords a solid support for the coil which is independent of the state of rigidity of the connected conductors.

In the construction as shown, the inner conductor has a wall thickness greater than that of the outer conductor since it extends through the cross bar 60 and insulation sleeve 73 and may be held in relatively fixed position thereby. The outer conductor 70, on the other hand, is supported largely by the workpiece and since for high frequency currents the conduction is concentrated adjacent the surface, the wall may be made thinner than that of the inner conductor. This permits a reduction in material and therefore diameter. Because of this thin wall construction the outer conductor may more readily adjust itself to the small lateral displacements occurring in long tubes due to temperature changes or offset construction.

While a guide ring or plate is specified, the head of one of the conductors or an arbor head may serve as a guide, an insulation plate forming the end closure and support. In either case the tube or workpiece wall may supply substantial support to the conductor or arbor. Since the outer conductor connects directly with the guide element it may be termed an arbor and as such may or may not function as a conductor.

Of value also in the construction of the apparatus is the function of the rubber gasket 82 in the guide ring, serving to accommodate expansion and contraction in the tubing of the inductor. It is, of course, apparent that the changes of temperature of the inductor tubing is large and that there will be a tendency of the tubing to work in the supports and hence a yieldable connection is of importance in the maintenance of successful operation.

The open space between concentric conductors is dimensioned preferably so as to equal approximately in volume, the inner volume of the inner conductor 72 so that the continuity of coolant flow, both in and out is uniformly maintained. This volume, in either case, is reduced to the smallest value necessary to supply adequate coolant. The insulation 14 is water proof and covers the inner conductor substantially throughout the length thereof in the inductor unit so that current leakage and the possibility of short circuiting through lateral shifting of the outer conductor is effectually eliminated.

While either liquid or air may be used as the quench medium I have found a spray mixture to be advantageous in giving a more flexible control over the cooling rate and offering less difficulty in removal than liquid alone. Also refrigerated coolant may be used in the coil circuit.

While the showing described may be preferred, variations may be made in the details thereof and hence no limitation is implied other than may be required by the prior art and the scope of the appended claims.

What is claimed is:

1. Induction heating apparatus comprising an arbor having inner and outer concentric tubular current conductors circumferentially spaced from each other for a large portion of the length thereof to form a fluid-conducting channel therebetween, said outer conductor extending axially beyond the adjacent end of said inner conductor, a closure for said adjacent end of said inner conductor, an electrically conductive closure for said extending end of said outer conductor, a hollow inductor having hollow terminals, said terminals extending through the closure for the outer conductor, one of said terminals being electrically connected with the outer conductor through said last-named closure and being in communication with the channel between said conductors and the other terminal being insulated from said last-named closure and extending through the other closure into communication with the interior of the inner conductor, said other terminal being electrically connected through said other closure with said inner conductor, the channel between said conductors, the interior of said inner conductor and the hollow of said inductors and the terminals thereof defining a path for the flow of cooling fluid in contact with both said conductors, and a cooling fluid inlet connection for one of said conductors and a cooling fluid outlet connection for the other of said conductors.

2. An induction heating apparatus for progressively heating the bore of an elongated article by electromagnetically induced heating currents, comprising an inductor coil, a supporting arbor including concentric current conductors connected at adjacent ends with said coil in axial extension of said conductors, a work support for supporting the article with the bore thereof in axial alignment with said coil and conductors, and means for effecting relative axial movement between said coil and conductors on the one hand and the article so supported, said outer conductor having a surface of uniform diameter engageable with the surface of the article bore during said relative movement to maintain said conductor in uniformly circumferentially spaced relation from the bore of the article.

3. Induction heating apparatus comprising an electrically conductive guide element adapted to be positioned normally in contact with a workpiece, means for moving said element and workpiece relative to each other, a heating coil mounted on, electrically connected to and supported solely by said element, and an electric conductor attached to said element, one end of the coil having electrical connection to the element and the other end of the coil being supported by the element but insulated therefrom, the conductor having electrical connection to said other coil end.

4. Induction heating apparatus comprising an arbor having inner and outer concentric tubular current conductors circumferentially open spaced from each other for a portion of the length thereof, a closure for the end of the outer conductor, a tubular conductor inductor coil having tubular connecting terminals, one of said terminals having rigid connections to said closure and communicating therethrough with the conductor interspace, the other of said terminals having connection to said inner conductor through said closure and communicating with the interior of the inner conductor, said other terminal being yieldably supported by said closure.

5. Induction heating apparatus for interior heating of long tubes comprising an arbor, means for securing relative axial movement between tube and arbor, said arbor having inner and outer concentric tubular current conductors circumferentially open spaced from each other for a portion of the length thereof, a closure for the end of the outer conductor, a tubular conductor inductor coil having tubular connecting terminals, one of said terminals having rigid connections to said closure and communicating therethrough with the conductor interspace, the other of said terminals having connection to said inner conductor through said closure and communicating with the interior of the inner conductor, said closure comprising combined metal and insulation members, the said inner conductor inductor terminal passing through and being supported by the insulation member.

6. Heating apparatus for inductively heating the bore surface of a tubular workpiece comprising an inductor unit, a supporting arbor including concentric current conductors connected at adjacent ends with said coil in axially aligned coil supporting relation thereto, a work support for supporting the workpiece with the bore thereof in axial aligggnment with said coil and conductors, and means for securing relative axial movement between workpiece and arbor, said inductor and concentric conductors being dimensioned for movement within the workpiece bore, and means for eliminating arcing between the outer current conductor and bore, said means including grounded conductors at both ends of said outer conductor.

7. Heating apparatus for heating inductively the bore surface of an extended tubular workpiece, comprising a tubular conductor inductor coil adapted for placement in said bore, means for securing relative axial movement between the workpiece and coil, concentric open-spaced conductors forming a unit having an over-all diameter in excess of that of said coil positioned in axial extension from said coil, the outer conductor end adjacent the coil substantially overlapping the inner conductor end, a closure for said outer conductor forming a coolant chamber with the inner conductor end, and tubular connectors between the coil ends and the inner end outer concentric conductors through said closure.

8. In inductive heating apparatus for internal heating of long tubes, a support element closely engageable with said tube interior, an inductor coil supported by said element, and elongated, conductors connected to said coil, at least one of said conductors being engageable with, normally supported by, and bendable to conform to, said tube interior.

9. In an inductive heat treating machine for the internal heat treatment of relatively long tubes, means to support the tube on a fixed axis, a mandrel adapted to enter one end of the tube, means for securing relative axial movement of the tube and mandrel relative to each other, and an inductor head secured at one end of the mandrel and maintained on the tube axis thereby, said mandrel being laterally bendable and possessing rigidity insufficient to maintain it on the tube axis, but possessing a diameter which so closely approximates the diameter of the tube being treated that the alignment of the mandrel upon its axis is maintained by the contact of the outer walls of the mandrel with the inner walls of the tube.

10. Induction heating apparatus for internal heating of long tubes comprising a rigid guide element adapted to be positioned normally in contact with the tube interior surface and subject to axial displacement along said surface, an arbor connected to said element for the support thereof, said arbor being freely bendable to permit conformation with the tube interior, and a heating coil mounted on and supported by said element, whereby said coil is rigidly maintained in spaced relation to said tube surface.

11. In an inductive heating machine for internal heating of long tubes, an induction coil, a guide element for supporting said coil within the tube, and an arbor including tubular inner and outer conductors connected to the guide element, the cross-sectional dimensions of guide element and outer conductor being approximately the same.

12. In inductive heating apparatus for internal heating of long tubes, an induction coil, a guide element for supporting said coil, conductors, one of which is grounded, supported within the tube by said guide element on the side of the guide element opposite to that of the coil, and electrical connectors between conductors and coil, the one of said connectors which is not grounded passing through said guide element at the point of maximum displacement from the grounded conductor and connector attached thereto.

13. In an inductive heat treating machine for the internal heat treatment of relatively long tubes, means to support the tube on a fixed axis, an inductor coil adapted for positioning within said tube, and a conductor unit supporting said coil and adapted for positioning within said tube in axial alignment with said coil, said conductor unit comprising inner and outer concentric metal tubes open spaced from each other, and a shell of insulation enclosing said inner tube, the volume of the inner tube interior being substantially equal to that of the interspace between tubes whereby minimum coolant flow at a uniform flow rate may be obtained.

14. In an inductive heating machine for long barrel bores, an electrically conductive heating coil, an electrically conducting guide support for the coil normally contacting with the bore surface and subject to axial displacement therewith, a coil positioned on one side of said guide and having terminals at least one of which extends through the guide at a point adjacent the center thereof, means for electrically insulating said central coil terminal, and electrical conductors electrically connected to the coil terminals and supported by said guide on the side of the guide opposite to said coil.

15. In an induction heat treating machine for the internal heat treatment of relatively long tubes, means to support a tube on a fixed axis, an inductor coil adapted for positioning within said tube, and an electrical conductor unit supporting said coil and adapted for positioning within said tube in axial alignment with said coil, said conductor unit comprising inner and outer metal tubes open spaced from each other and a shell of insulation enclosing said inner tube, the transverse area of the inner space of the inner tube along the length thereof being approximately equal to the transverse area of the space between the inner and outer conductors along the length of the unit.

HAROLD A. STRICKLAND, JR.

REFERENCES CITED

The following references are of record in the file of this patent:

UNITED STATES PATENTS

| Number | Name | Date |
| --- | --- | --- |
| 2,181,274 | Jackson | Nov. 28, 1939 |
| 2,182,820 | Pisarev | Dec. 12, 1939 |
| 2,241,431 | Somes | May 13, 1941 |
| 2,288,035 | Somes | June 30, 1942 |
| 2,288,039 | Somes | June 30, 1942 |
| 2,318,468 | Denneen et al. | May 4, 1943 |
| 2,359,058 | Somes | Sept. 26, 1944 |
| 2,397,442 | Somes | Mar. 26, 1946 |

OTHER REFERENCES

"Coupling Methods for Induction Heating," Electronic Industries, April, 1944, pages 80–83, 174, 176, 178, 180, 182, 184, 186, 188 and 190. Copy in Scientific Library. Particularly pages 178 and 180.